Figure 4:
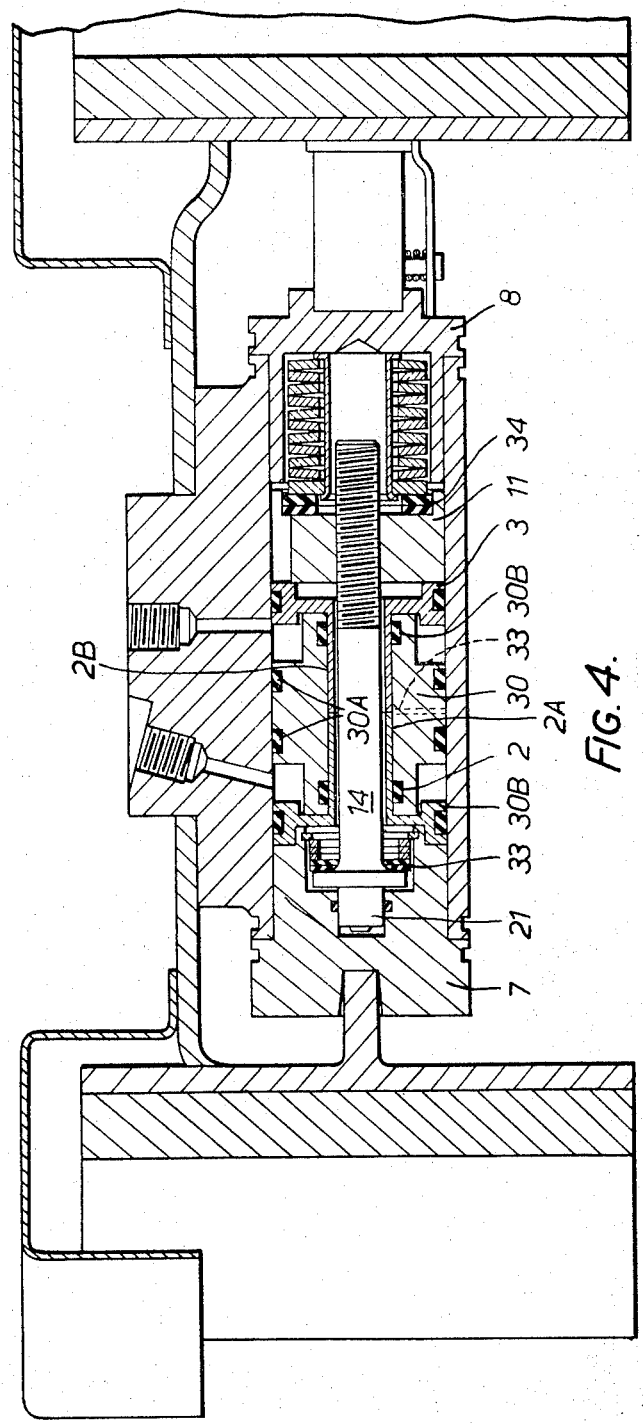

United States Patent
Crabtree

[15] 3,684,063
[45] Aug. 15, 1972

[54] VEHICLE BRAKE ACTUATOR AND LOCK ASSEMBLY

[72] Inventor: Norman Crabtree, Kings Road Tyseley, Birmingham 11, England

[22] Filed: March 31, 1970

[21] Appl. No.: 24,105

[30] Foreign Application Priority Data

April 3, 1969 Great Britain..........17,692/69
June 13, 1969 Great Britain..........30,190/69
July 3, 1969 Great Britain..........33,624/69

[52] U.S. Cl. ..........................188/265, 92/17, 92/75, 192/114
[51] Int. Cl..............................................F16d 63/00
[58] Field of Search.....188/265; 92/17, 75; 192/114; 303/89

[56] References Cited
UNITED STATES PATENTS 3,472,124  10/1969  Roselius et al.............92/17 X
3,172,503  3/1965   Haubert.................188/364 X

FOREIGN PATENTS OR APPLICATIONS 1,162,215  1/1964   Germany..................188/265

Primary Examiner—George E. A. Halvosa
Attorney—Scrivener, Parker, Scrivener and Clarke

[57] ABSTRACT

A slave cylinder for an internal shoe drum brake is provided internally with extensible strut means which normally follow up brake shoe applying movements of the cylinder and which can be locked in an extended position to hold the shoes applied mechanically, after the hydraulic (foot pedal) pressure has been released.

8 Claims, 5 Drawing Figures

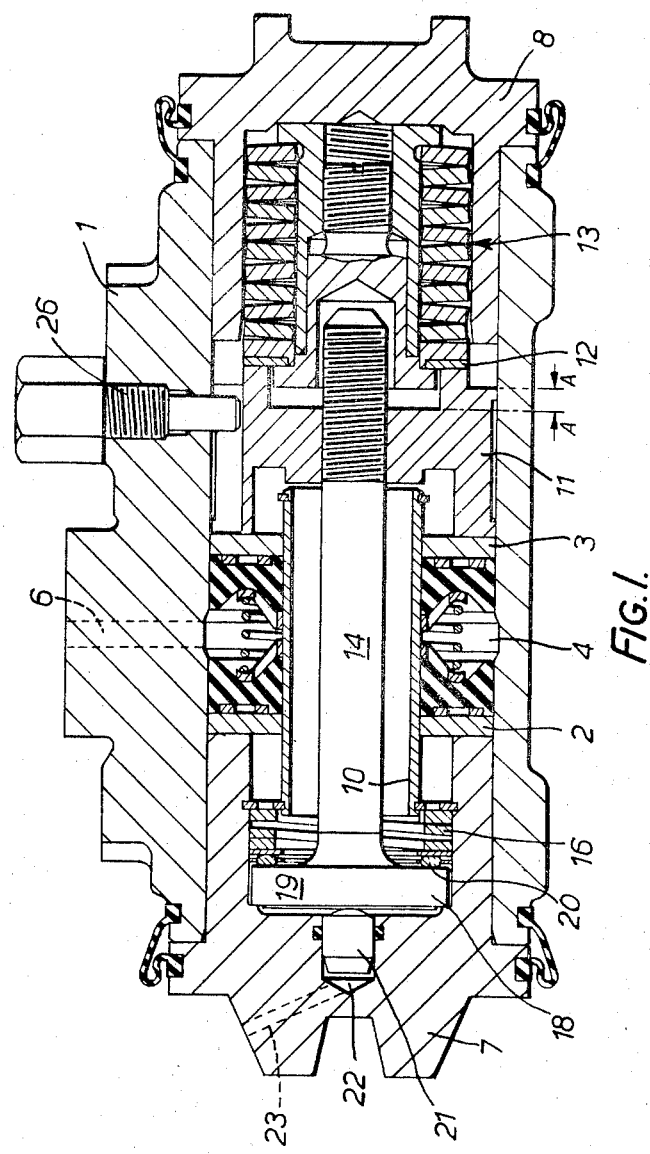
FIG. I.

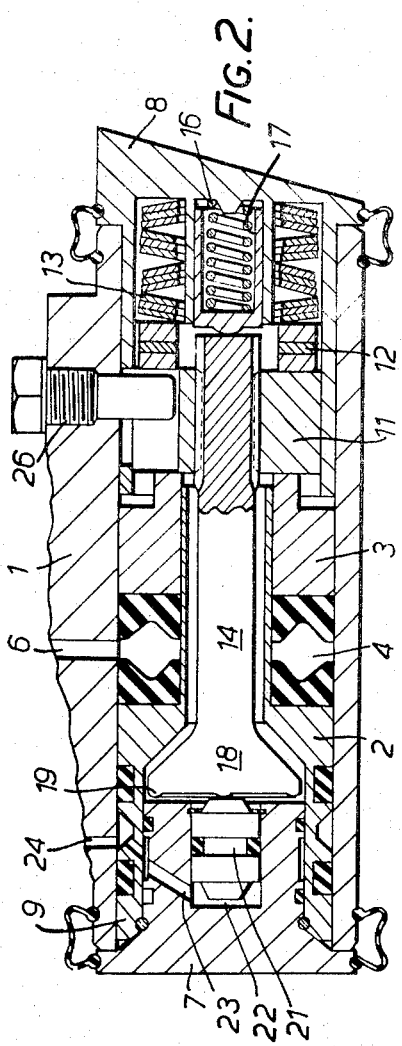
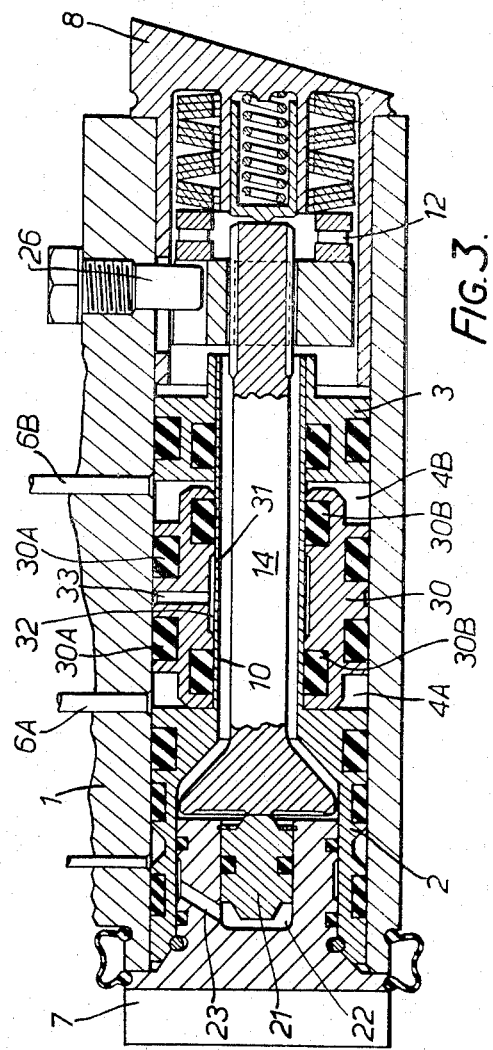

VEHICLE BRAKE ACTUATOR AND LOCK ASSEMBLY

This invention relates to vehicle drum brakes having hydraulic slave wheel cylinders for applying the brake shoes to the brake drum and means for following up movement of a brake shoe, and for holding it in braking engagement with the drum after release of the hydraulic braking pressure, so providing a parking brake facility.

Such locking arrangements are known, for example, in which the output rod of a pneumatically operated actuator can be locked in extended position. The rod itself works on the wedge of a mechanical brake expander fitted to the wheel brake. Such an arrangement is generally satisfactory if the installation fulfils the substantial space requirement of a remote actuator, although there is a tendency to lose parking brake efficiency due to tolerances, clearances and lost motions in the linkage.

The present invention aims at the provision of a brake locking facility of this general kind, which is more compact than the prior arrangement mentioned above and which is also less liable to mechanical transmission losses.

In accordance with a feature of the present invention, there is provided an hydraulic slave wheel cylinder for an internal shoe drum brake, comprising a pair of opposed thrust members which are urged apart in use by hydraulic braking pressure, a strut of adjustable length acting between the thrust members and an auxiliary fluid pressure actuated motor incorporated in the cylinder having one operative condition in which the strut is free to extend and retract to follow up movements of the thrust members, and another operative condition in which the strut is locked in an extended position, the arrangement being such that, in use, the strut can be locked in an extended position to hold the thrust members apart against the brake shoe return forces, after the actuating braking pressure has been released.

By this means, a compact unit can be obtained, not necessarily much larger in size than a conventional wheel cylinder, and in which transmission losses are minimized by virtue of the intimate relationship of the working parts. The invention is applicable to the wheel cylinder of internal shoe drum brakes, whether single or double ended and whether having one or two pressure chambers.

Preferably, however, the slave cylinder is of the double ended type frequently used in internal shoe drum brakes and acting through opposed thrust members, such as tappets, at opposite ends of the cylinder, and the strut acts between the said thrust members. A resilient overload device may be incorporated in the wheel brake to limit the thrust which can be transmitted back to the strut, and this device is preferably incorporated in the slave cylinder, between the strut and one thrust member.

The strut may comprise a pair of strut parts having a reversible screw-thread connection between them so that axial adjustment of the parts is accompanied by relative rotation. The parts can be locked against or freed for such relative rotation by a friction clutch itself controlled by the auxiliary fluid pressure motor which is also incorporated in the slave cylinder.

Some preferred forms of hydraulic slave cylinder in accordance with the invention will now be described, by way of example only, with reference to the accompanying drawings, in which: FIGS. 1, 2, 3, 4 and 5 are axial sections of five respective drum brake slave wheel cylinders.

For convenience, corresponding parts of the respective embodiments are identified by the same reference numerals.

The slave cylinder shown in FIG. 1 is of the double-ended type commonly used in vehicle drum brakes having two internal shoes. It comprises a housing, or cylinder body 1 having opposed annular pistons 2 and 3 separately sealed and exposed at their adjacent ends to the pressure in a central working chamber 4 having a pressure port 6 and defined in part by a tubular member 10, which extends in sliding sealed relation through the pistons 2 and 3. A pair of opposed thrust members in the form of tappets 7 and 8 are mounted at the ends of the housing 1, and in use these tappets engage the adjacent ends of respective brake shoes or brake shoe carriers. The left hand piston 2 has its outer end in direct abutting engagement with the respective tappet 7, while the other piston 3 engages the adjacent tappet 9 through the intermediary of a ring part 11, a thrust bearing 12 and a resilient overload device in the form of a pack 13 of belleville spring washers arranged in groups which are alternately reversed with respect to their conicity.

The ring part 11 forms one member of a strut of adjustable length, the other member of which is formed by a central shaft part 14, which has a reversible screw-thread connection with the ring 11. The left-hand end of the shaft has a head 18, the outer face 19 of which forms a friction clutch face for co-operation with the adjacent, inner face of the left-hand tappet 7, and is engageable by the piston 21 of an auxiliary fluid pressure motor. The piston 21 works in a chamber 22 formed in the tappet 7 and having a fluid pressure port 23. A coil spring 16 housed within the tappet 7 and acting through a needle thrust bearing 20 on the head 18, urges the head into frictional clutching engagement with the adjacent face of the tappet 7.

In the normal operative condition of the slave cylinder, chamber 22 is pressurized and the piston 21 holds the shaft 14 in the position illustrated, in which the clutch face 19 is clear of the tappet 7 and the shaft is therefore free to rotate relative to the ring 11, which is keyed against rotation by a removable pin 26.

With the chamber pressurized, operation of the hydraulic brakes forces the pistons 2 and 3, with their associated tappets, outwardly to apply the brake shoes to the drum, and when the brake applying pressure is released the pistons and tappets are forced back towards each other by the shoe return springs. These movements of the tappets towards and away from each other are freely followed up by the strut 11, 14 since the ring 11 is forced to follow the movements of piston 3 and tappet 8, and the spring 16 holds the shaft 14 in contact with the auxiliary piston 21. The reversible screw thread causes the shaft to rotate during this relative axial movement of the shaft and ring.

If the driver wishes to park the vehicle, he applies the service brake in the normal way and operates a control valve to release the pressure in chamber 22, whereupon the friction clutch between the face 19 and the left-hand tappet is engaged (due to the resilient bias of spring 16), thereby locking the shaft against rotation. The braking pressure is then relaxed, by releasing the foot brake, but the tappets are held apart against the shoe return forces by the strut, which is now locked in an extended position.

To release the parking brake, the chamber 22 is pressurized, releasing the friction clutch so that the shaft can rotate again relative to the ring. The thrust forces which can be transmitted back to the strut are limited by the resilient overload device 13 which is so designed that it has substantially zero deflection up to a predetermined compressive load, and can then deflect at a relatively low spring rate. Without this safeguard, it would be possible for the thrust applied to the struts to be in excess of that which can be overcome by the auxiliary motor. For example, very large thrusts could be generated if the strut were locked while the brake drum was overheated and then subjected to the thermal contraction forces transmitted back through the brake shoes. If, in spite of this precaution, the strut should remain locked, the parts can be freed for relative rotation by removal of the pin 26.

It may be desirable in some cases to limit the possible deflection of the spring washers 13 under high loading conditions by suitable dimensioning of the adjacent components so that these provide a positive mechanical restraint against deflection above a predetermined maximum. For example, in FIG. 1 the clearance "A" can be dimensioned to correspond with the desired maximum deflection of the spring washers.

FIG. 2 shows a very similar wheel cylinder, but in this embodiment, the tubular member 10 is formed as extension, integral or otherwise fast with the piston 2. The thrust race 12 takes the form of a needle roller thrust bearing. Another minor modification resides in the arrangement of spring 16, which in this case is constituted by a small coil compression spring acting between the right hand tappet 8 and a cup 17 slidable in the tappet and bearing against the adjacent end of the shaft 14. Finally, the fluid inlet passage 23 for auxiliary motor cylinder 22 opens into an annular recess in the tappet 7, supplied with pressure fluid from a supply passage 24 in the cylinder body 1, connected to an annular recess in the piston 2. These two annular recesses are in permanent communication by means of a port 25 in the piston wall.

The slave cylinder shown in FIG. 3 is also generally similar in function and operation to that of FIG. 1 but is principally distinguished by the fact that it also has a floating intermediate piston 30 interposed between pistons 2 and 3, and defines with the end pistons 2 and 3 separate working chambers 4A and 4B having their own supply ports 6A and 6B.

In this embodiment, the tubular member 10 is formed as an integral, tubular extension of end piston 2, and extends in sliding, sealed relation through the intermediate piston 30 and through the other end piston 3. The intermediate piston has a pair of axially spaced outer piston seals 30A and a pair of axially spaced inner seals 30B. An annular space 32 is formed on the inner periphery, between seals 30B and has a radial seepage passage 33 which extends to the outer periphery, between seals 30A. A seepage 31 formed in the tubular member 10 is positioned to communicate with the space 32 in all relative working positions of the parts. With this arrangement, any fluid which may leak past any of the seals 30A and 30B, in the event of failure of one of these seals, can reach the space 32 and then escape through the port 31 to the interior of the tubular member 30 from whence the fluid can escape around the outside of tappet member 8 to the exterior of the cylinder, thus giving a visual indication of a seal failure. Fluid escaping from the auxiliary motor chamber 22 can be similarly detected.

The slave wheel cylinder shown in FIG. 4 is generally similar to that of FIG. 2, but has the tubular member 10 replaced by co-operating tubular projections 2A and 2B formed integrally or otherwise fast with the end pistons 2 and 3. These projections abut, in the contracted condition of the slave cylinder pistons, within the axial extent of the intermediate piston 30, the inner piston seals 30B of which are sufficiently spaced axially to ensure that each maintains sealing engagement with the respective projection 2A or 2B throughout the full range of relative movement of the parts. In this case, fluid leaking past the seals of the intermediate piston is able to escape between the adjacent ends of the extensions 2A and 2B.

Figure 5:
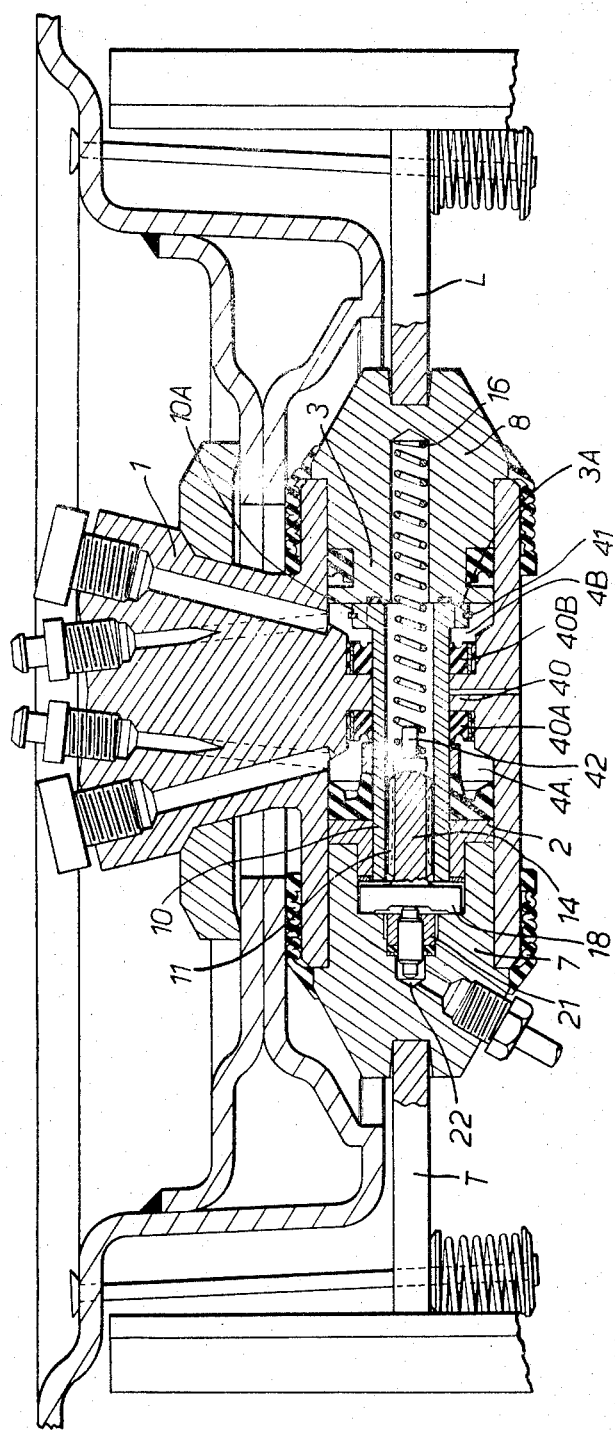

FIG. 5 exemplifies the application of the invention to a slave wheel cylinder in which the body or housing 1 has a fixed internal portion 40 dividing the interior of the cylinder into two separate pressure chambers 4A and 4B, bordered by respective stationary seals 40A and 40B. The right-hand piston 3 is formed integrally with tappet 8 and has a tubular extension member 10 which has a castellated end, the castellations 10A of which fit between corresponding castellations 3A in the inner face of the piston, and the parts are secured together by a circlip 41 located in a groove extending through the two sets of castellations. The left-hand end of the member 10 is internally screw-threaded at 11 to co-operate with screw part 14, so that the member 10 forms part of the strut 11, 14. The biassing spring 16 which urges the screw-part 14 into frictional clutching engagement with the left hand tappet 7 now acts on a button 42 in turn pressing against the screw part 14.

In this embodiment, rotation of the strut member 10, 11 is prevented by its non-rotatable connection to the combined piston and tappet 3, 8, which is in turn held against rotation by its interengagement with one shoe-web L, the opposite tappet 7 being similarly engaged by shoe web T.

The remaining features of construction and operation will be apparent in the light of the description given in relation to FIGS. 1 to 4.

Many variations and modifications will, of course, be possible within the scope of the present invention. For example similar brake locking arrangements could be incorporated in slave cylinders of the single-ended type, one thrust member being constituted by the cylinder body itself.

In each example described above, it will be seen there is provided a completely self-contained slave cylinder unit incorporating the special locking means, so that the units could quite feasibly be incorporated not only as original equipment but also to modify existing brake constructions.

I claim:

1. In or for a vehicle internal shoe drum brake having a pair of arcuate brake shoes and a rotary drum, an improved hydraulic wheel cylinder comprising a cylinder body containing a pair of opposed pistons movable in opposite directions relative to said cylinder body, fluid pressure chamber means between said pistons, thrust members at opposite ends of said cylinder body, each being movable relative to said cylinder body between extended and retracted positions by said pistons in response to fluid pressure in said chamber means, a strut assembly in said cylinder body comprising a pair of cooperating relatively extensible and retractable strut parts in axial alignment with said thrust members and having respective operative connections with said members so that said parts follow up movement of said thrust members between their extended and retracted positions, selectively operable strut locking means having a first condition in which said strut parts are free to follow up movement of said thrust members and a second operative condition in which said strut parts are locked in their extended position to prevent retractive movement of said thrust members, and an auxiliary fluid pressure operated motor for selecting said first and second conditions of said locking means.

2. The improved wheel cylinder of claim 1 wherein one said strut part and one piston both act directly on one thrust member, the other of said pistons acting on the other of said strut parts and pre-stressed resilient means interposed between said other of said strut parts and the other of said thrust members for transmitting thrust between said other strut part and said other thrust member.

3. The improved wheel cylinder of claim 1 including a tubular member extending through said pressure chamber means in fluid tight relation with said pistons, said strut assembly extending through the interior of said tubular member.

4. The improved wheel cylinder of claim 3 wherein said fluid pressure chamber means is a common chamber between said opposed pistons.

5. The improved wheel cylinder of claim 1 wherein said fluid pressure chamber means is defined by a fixed, internal partition wall dividing the interior of said cylinder into two separate pressure chambers, each having one of said opposed pistons therein, and including a tubular member extending in sliding, sealed relation through said wall and through one of said pistons, said tubular member being sealed to the other of said pistons and forming part of said strut assembly.

6. The improved wheel cylinder of claim 5, comprising a reversible, internal screw thread in said tubular member, a screw member operatively engaged with said thread and constituting a second part of said strut means and means for selectively and alternately locking said tubular member and said screw member against relative rotation and freeing them for such rotation.

7. The improved wheel cylinder of claim 1, including a floating, annular intermediate piston disposed between said opposed pistons, said pistons defining two separate pressure chambers and tubular projection means extending in sealed relation through said pressure chambers and in sliding sealed relation through said intermediate piston, and wherein said strut means extends through the interior of said tubular projection means.

8. The improved wheel cylinder of claim 7, wherein said intermediate piston comprises axially spaced outer seals and inner seals and fluid passage means extending radially through said piston, in an axial zone intermediate the said seals, and said tubular projection means defines passage means for the escape of fluid from said intermediate zone to the interior of said projection means.

* * * * *